United States Patent
Nakamura et al.

(10) Patent No.: US 10,065,324 B2
(45) Date of Patent: Sep. 4, 2018

(54) CONVEYING APPARATUS

(71) Applicant: JTEKT CORPORATION, Osaka-shi (JP)

(72) Inventors: Eiji Nakamura, Nagoya (JP); Minoru Ohki, Nagoya (JP); Koyo Yamazaki, Nagoya (JP); Fumiki Ogawa, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/357,468

(22) Filed: Nov. 21, 2016

(65) Prior Publication Data

US 2017/0144845 A1 May 25, 2017

(30) Foreign Application Priority Data

Nov. 25, 2015 (JP) .................. 2015-230072

(51) Int. Cl.
| | |
|---|---|
| *B25J 15/00* | (2006.01) |
| *B65G 47/86* | (2006.01) |
| *B23Q 7/04* | (2006.01) |
| *B65G 47/90* | (2006.01) |
| *B65G 25/06* | (2006.01) |
| *B23Q 7/14* | (2006.01) |
| *B23Q 11/08* | (2006.01) |

(52) U.S. Cl.
CPC ............ *B25J 15/0028* (2013.01); *B23Q 7/04* (2013.01); *B23Q 7/047* (2013.01); *B23Q 7/1405* (2013.01); *B23Q 11/08* (2013.01); *B65G 25/06* (2013.01); *B65G 47/847* (2013.01); *B65G 47/90* (2013.01); *B65G 47/904* (2013.01); *B65G 47/907* (2013.01)

(58) Field of Classification Search
CPC ....... B23Q 7/04; B23Q 7/1494; B25J 15/0028
See application file for complete search history.

(56) References Cited

U.S. PATENT DOCUMENTS

| | | | | |
|---|---|---|---|---|
| 3,556,315 | A | * | 1/1971 | Berger .................. B21D 43/10 294/106 |
| RE29,797 | E | * | 10/1978 | Mink ...................... B25J 15/02 414/739 |
| 4,573,862 | A | * | 3/1986 | Anderson ............ B65G 47/901 198/468.2 |

(Continued)

FOREIGN PATENT DOCUMENTS

JP 7-148636 6/1995

*Primary Examiner* — Thomas Randazzo
(74) *Attorney, Agent, or Firm* — Oblon, McClelland, Maier & Neustadt, L.L.P.

(57) ABSTRACT

A conveying apparatus conveys an article between a wait position and a processing position. The conveying apparatus includes a plurality of arms that sandwiches the article between leading ends of the arms located on opposite sides of the article and that is provided to enable base ends of the arms to turn so as to move the leading ends in an up-down direction, and a control apparatus that turns the arms to lift the article located at one of the wait position and the processing position and sandwiched between the arms and that moves the arms with the article kept lifted thereby to the other of the wait position and the processing position, the control apparatus turning the arms to lower and mount the article at the other of the wait position and the processing position.

6 Claims, 6 Drawing Sheets

(56) References Cited

U.S. PATENT DOCUMENTS

| | | | | |
|---|---|---|---|---|
| 4,787,280 | A * | 11/1988 | Voelkerding | B23B 3/161 82/124 |
| 7,179,043 | B2 * | 2/2007 | Jager | B23Q 1/623 414/222.01 |
| 7,469,568 | B2 * | 12/2008 | Reissenweber | B21J 13/10 72/361 |
| 8,672,376 | B1 * | 3/2014 | Wilson | B25J 15/0028 294/116 |
| 9,102,063 | B2 * | 8/2015 | Ito | B25J 9/1669 |
| 9,486,927 | B1 * | 11/2016 | Morey | B25J 15/10 |
| 9,492,926 | B2 * | 11/2016 | Mattern | B25J 9/1612 |
| 9,815,193 | B2 * | 11/2017 | Trujillo | B25J 9/1612 |
| 2003/0180137 | A1 * | 9/2003 | Schuster | B23Q 7/001 414/746.3 |
| 2012/0228892 | A1 * | 9/2012 | Urabe | B25J 9/0087 294/213 |

\* cited by examiner

CONVEYING APPARATUS

INCORPORATION BY REFERENCE

The disclosure of Japanese Patent Application No. 2015-230072 filed on Nov. 25, 2015 including the specification, drawings and abstract, is incorporated herein by reference in its entirety.

BACKGROUND OF THE INVENTION

1. Field of the Invention

The invention relates to a conveying apparatus used for a processing apparatus that executes predetermined processing on an article, to convey the article between a processing position for the processing apparatus and a wait position.

2. Description of the Related Art

A conveying apparatus disclosed in, for example, Japanese Patent Application Publication No. H07-148636 (JP H07-148636 A) has been available which loads and unloads an article such as a workpiece into and from a processing apparatus that processes the article, for example, a processing station for a machine tool. In JP H07-148636 A, a plurality of conveying apparatuses 100 is arranged between a plurality of processing stations arranged in alignment so as to consecutively execute processing. Each of the conveying apparatuses 100 includes a slide apparatus 1 on which a workpiece W is mounted in engagement with an engagement portion on an upper surface of the slide apparatus 1. The slide apparatus 1 loads and unloads the workpiece W into and from the processing station by sliding in a conveying (loading and unloading) direction of the workpiece W to enter the processing station.

At this time, the workpiece W is transferred between the slide apparatus 1 and the processing station using an elevating apparatus provided in the conveying apparatus 100. When the workpiece W is passed from the slide apparatus 1 to the processing station, first, the elevating apparatus is actuated to elevate the upper surface of the slide apparatus 1 (a mounting surface for the workpiece W) so as to align the upper surface with the height of the mounting surface for the workpiece W in the processing station, while bringing a protruding portion provided on the upper surface in engagement with a recessed portion formed in a lower surface of the workpiece W. The slide apparatus 1 is then slid toward the processing station along with the workpiece W to push the workpiece W into a mounting position (processing position) in the processing station. In this case, the mounting surface at the mounting position for the workpiece W in the processing station is shaped to receive only a part of an outer peripheral portion of the lower surface of the workpiece W. The slide apparatus 1, remaining engaged with the workpiece W, can advance to a delivery position (mounting position) for the workpiece W. Subsequently, the elevating apparatus is lowered to disengage the workpiece W from the slide apparatus 1 and to transfer the workpiece W to the mounting position in the processing station.

In contrast, when the workpiece W is moved from the processing station to the slide apparatus 1, the elevating apparatus is actuated to lower an upper surface of the conveying apparatus 100. The slide apparatus 1 is then slid toward the processing station, and the upper surface of the slide apparatus 1 is slid under the workpiece W located at the delivery position. Subsequently, the elevating apparatus is elevated to bring the lower surface of the workpiece W into engagement with the upper surface of the slide apparatus 1. The slide apparatus 1 is then slid away from the processing station. Thus, the workpiece W can be moved onto the upper surface of the slide apparatus 1.

Such conveying apparatuses 100 are each arranged between the processing stations arranged in alignment, so as to form a conveying path. Thus, the conveying apparatus 100 affects the line length of the processing stations, and the line length increases in proportion to the number of conveying apparatuses 100 arranged. In the technique in JP H07-148636 A, an expensive elevating apparatus is used to transfer the workpiece W between the conveying apparatus 100 and the processing station. Consequently, the conveying apparatus 100 involves a high cost.

SUMMARY OF THE INVENTION

With the above-described problems in view, an object of the invention is to provide a conveying apparatus that can be produced at low cost without affecting the line length of processing apparatuses.

A conveying apparatus in an aspect of the invention is used for a processing apparatus that executes predetermined processing on an article mounted at a processing position, and conveys the article between a wait position and the processing position. The conveying apparatus includes a plurality of arms that is movable between the wait position and the processing position and that sandwiches the article between leading ends of the arms located on opposite sides of the article, the arms being provided so as to make a separation distance between the arms variable and to enable base ends of the arms to turn so as to move the leading ends in an up-down direction; and a control apparatus that turns the arms to lift the article located at one of the wait position and the processing position and sandwiched between the arms and that moves the arms with the article kept lifted thereby to the other of the wait position and the processing position, the control apparatus turning the arms to lower and mount the article at the other of the wait position and the processing position.

In the conveying apparatus in this aspect, the article located at the one of the wait position and the processing position is sandwiched between the arms, and subsequently, the arms turn to lift the article in the air. Then, the lifted article is moved toward the other of the wait position and the processing position, and after the movement, the arms are turned to lower and mount the article at the other of the wait position and the processing position. Thus, for example, when a plurality of processing apparatuses are arranged to form a line and a conveying apparatus conveys the article between the processing apparatuses, a conveying path need not be formed by providing slide apparatuses, conveyors, and the like between the processing apparatuses (for example, processing stations). Consequently, the line length is prevented from being affected. Therefore, a compact line with a small line length can be configured.

The turning operation of the arms replaces the function of elevating and lowering operations of an elevating apparatus in the related art. In other words, the turning operation of the arms has a function to separate the article from each of the wait position and the processing position. Thus, the turning operation of the arms, which is a simple operation of a simple configuration, can replace the operation of the elevating apparatus, correspondingly allowing the conveying apparatus to be produced at low cost. Since the article remains separate from the wait position and the processing position while being conveyed between the wait position and the processing position, the article is prevented from being rubbed against the upper surface at the mounting position. This allows a bottom surface of the article to be prevented from being damaged during conveyance.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of a conveying apparatus in the present invention will be described below with reference to the drawings. The conveying apparatus is used for a processing apparatus that processes articles. In other words, the conveying apparatus is an apparatus that loads or unloads an article into or from a processing apparatus that processes articles. In the embodiment, the processing apparatus is a machine tool. For predetermined processing in this case, an aspect is illustrated in which machining processing is executed on a workpiece W that is the article. The conveying apparatus is used for a production line including a plurality of machine tools.

Figure 1:
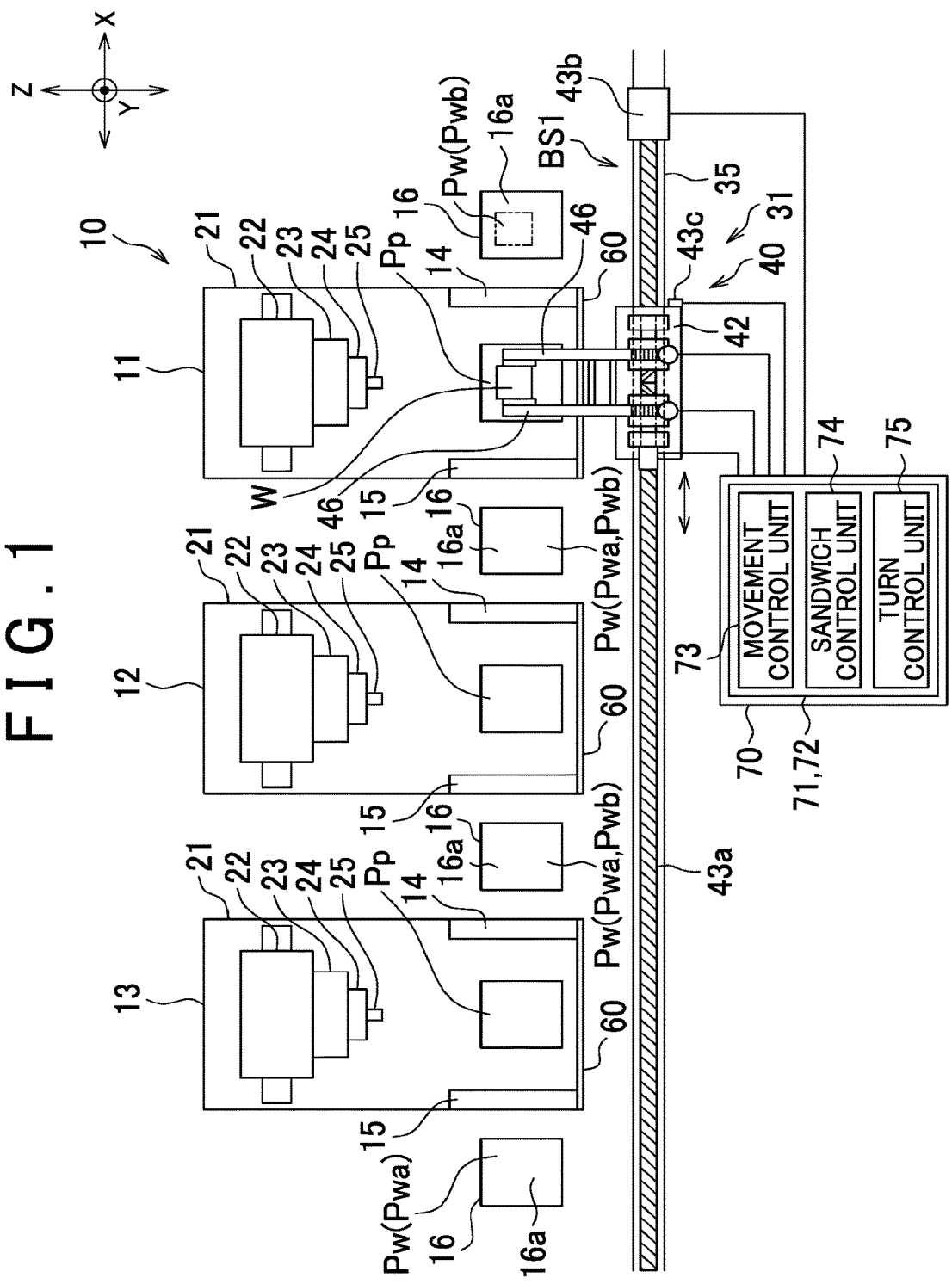
FIG. 1 is a plan view of a production line and a conveying apparatus in an embodiment.

A general configuration of a production line 10 and a conveying apparatus 31 will be described with reference to the drawings. As depicted in FIG. 1, the production line 10 includes three machine tools 11 to 13 (processing apparatuses) and one conveying apparatus 31. The machine tools 11 to 13 are of the same type. In each of the machine tools 11 to 13, a clamp apparatus clamps a workpiece W (corresponding to the article) mounted at a processing position Pp set in the machine tool. Each of the machine tools 11 to 13 executes machining processing such as cutting on the workpiece W mounted at the processing position Pp. The three machine tools 11 to 13 are installed at predetermined intervals so as to substantially linearly align the processing positions Pp with one another to form the production line 10.

Figure 2:
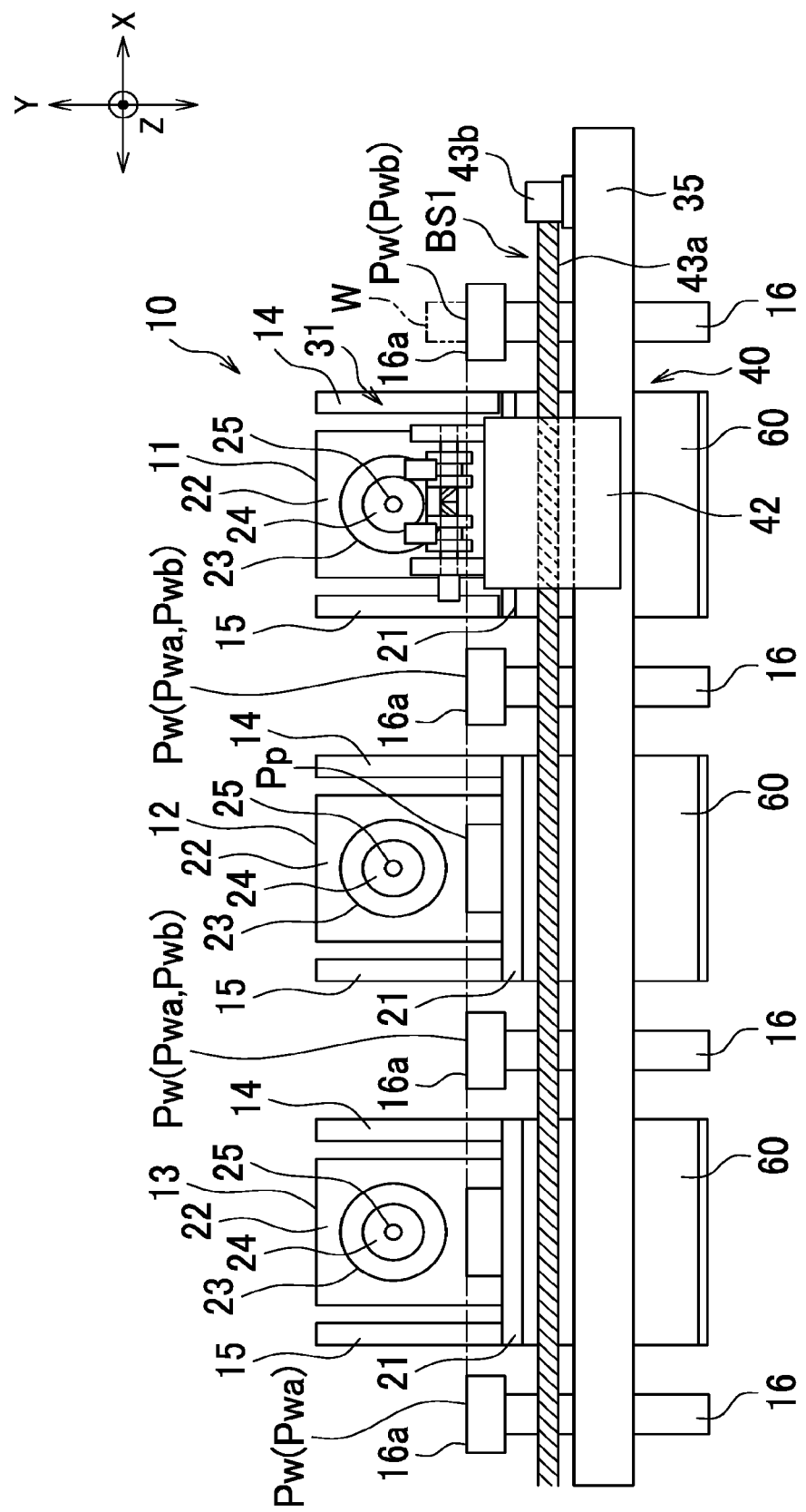
FIG. 2 is a front view of the production line and the conveying apparatus in the embodiment.

One of the three machine tools 11 to 13 that is installed on the most upstream side (in FIG. 1, a right side) of the production line 10 is referred to as a first machine tool 11. The machine tool installed downstream of the first machine tool 11 is referred to as a second machine tool 12, and the machine tool installed downstream of the second machine tool 12 is referred to as a third machine tool 13. The first machine tool 11 has a column 22 that is movable in an X-axis direction (in FIG. 1, a lateral direction) with respect to a bed 21. On a front surface of the column 22, a saddle 23 is provided which is movable in a Y-axis direction (in FIG. 1, a depth direction) with respect to the column 22. On a front surface of the saddle 23, a rotary main spindle 24 is provided which is movable in a Z-axis direction (in FIG. 1, an up-down direction) with respect to the saddle 23. A rotary tool 25 is held by the rotary main spindle 24. The second machine tool 12 and the third machine tool 13 are configured similarly to the first machine tool 11. The X-, Y-, and Z-axis directions are as depicted in FIG. 1 and FIG. 2.

Each of the machine tools 11 to 13 executes machining processing on the workpiece W fixed at the corresponding processing position Pp. Specifically, the workpiece W is machined by actuating the column 22 and the saddle 23 to move the rotating rotary tool 25 relative to the workpiece W. The conveying apparatus 31 sequentially conveys the workpiece W from the upstream side to the corresponding processing positions Pp in the machine tools 11 to 13.

The processing position Pp in the present embodiment refers to a position in each of the machine tools 11 to 13 where the conveying apparatus 31 delivers and receives the workpiece W to and from the machine tool. However, the processing position Pp is not only the position where conveying apparatus 31 delivers the workpiece W. In the present embodiment, the processing position Pp is where each of the machine tools 11 to 13 machines the workpiece W.

However, the invention is not limited to this aspect. In other words, the workpiece W mounted at the processing position Pp in each of the machine tools 11 to 13 by the conveying apparatus 31 may be moved to a predetermined position within the machine tool using a predetermined conveying unit. After being moved to the predetermined position within the machine tool, the workpiece W may be clamped and fixedly positioned and then machined. In this case, after the machining processing, the workpiece W machined at the position different from the processing position Pp is moved back to the processing position Pp using the predetermined conveying unit and then unloaded by the conveying apparatus 31.

As depicted in FIG. 1 and FIG. 2, a pre-loading wait position Pwb (corresponding to a wait position Pw) and a post-unloading wait position Pwa (corresponding to the wait position Pw) are set on opposite sides of the processing position Pp in each of the machine tools 11 to 13 in the X-axis direction (in FIG. 1 and FIG. 2, the lateral direction). The pre-loading wait position Pwb is a wait position where the workpiece W not machined by each of the machine tools 11 to 13 yet waits. In the present embodiment, the pre-loading wait position Pwb is set on the upstream side (in FIG. 1, the right side) of the production line 10 with respect to the processing position Pp in each of the machine tools 11 to 13.

The post-unloading wait position Pwa is a wait position where the workpiece W waits which has been machined by each of the machine tools 11 to 13 and unloaded and transferred from the processing position Pp. In the present embodiment, the post-unloading wait position Pwa is set on a downstream side (in FIG. 1, a left side) of the production line 10 with respect to the processing position Pp. As depicted in FIG. 1 and FIG. 2, the post-unloading wait position Pwa of the first machine tool 11 is also used as the pre-loading wait position Pwb of the second machine tool 12.

Similarly, the post-unloading wait position Pwa of the second machine tool 12 is also used as the pre-loading wait position Pwb of the third machine tool 13. The pre-loading wait position Pwb and the post-unloading wait position Pwa are set on an upper surface 16a of each of four mounting stands 16. The upper surface 16a of each mounting stand 16 is preferably formed at the same height as that of an upper surface of the processing position Pp (see FIG. 2).

As depicted in FIG. 1 and FIG. 2, each of the machine tools 11 to 13 includes fixed side walls located on the opposite sides of the processing position Pp, that is, between the pre-loading wait position Pwb and the processing position Pp and between the processing position Pp and the post-unloading wait position Pwa to separate the pre-loading wait position Pwb from the processing position Pp, while separating the processing position Pp from the post-unloading wait position Pwa.

The side wall formed between the pre-loading wait position Pwb and the processing position Pp is a first side wall 14. The side wall formed between the processing position Pp and the post-unloading wait position Pwa is a second side wall 15. The first side wall 14 and the second side wall 15 have a function to prevent foreign materials such as chips from scattering when the workpiece W is machined at the processing position Pp in each of the machine tools 11 to 13. Specifically, the first side wall 14 and the second side wall 15 appropriately prevents the foreign materials such as chips from scattering toward the pre-loading wait position Pwb and the post-unloading wait position Pwa and adhering to the workpiece W mounted at the pre-loading wait position Pwb and the post-unloading wait position Pwa.

Now, the conveying apparatus 31 will be described. As depicted in FIGS. 1 to 4, the conveying apparatus 31 includes a guide 35, a conveying unit 40, a receiving member 50, an opening door 60, and a control apparatus 70. Driving portions of the conveying unit 40 described below are connected to the control apparatus 70. The control apparatus 70 issues commands to the driving units to allow the conveying unit 40 to be guided and moved between the pre-loading wait position Pwb (wait position) and the processing position Pp and the post-unloading wait position Pwa (wait position) along the guide 35. The conveying unit 40 thus conveys (loads and unloads) the workpiece W to the positions Pwb, Pp, Pwa. FIG. 1 and FIG. 2 illustrate that the workpiece W mounted at the processing position Pp in the machine tool 11 is sandwiched between arms 46, 46 of the conveying apparatus 31 located on the opposite sides of the workpiece W by way of example.

The guide 35 is one long shaft member formed of a metal member, for example, iron. The guide 35 is arranged in front of the machine tools 11 to 13 in the Z-axis direction (a lower side of FIG. 1) so as to extend parallel to the direction in which the machine tools 11 to 13 are arranged in alignment. The guide 35 has a predetermined distance from the processing positions Pp in the machine tools 11 to 13 in the Z-axis direction. The guide 35 is linearly formed over the range from the pre-loading wait position Pwb of the first machine tool 11 to the post-unloading wait position Pwa of the third machine tool 13.

For example, a leg portion of the guide 35 extending from a lower surface thereof and not depicted in the drawings is fixed to a front surface of a bed 21 of each of the machine tools 11 to 13 or to a side surface of the machine tool. However, the invention is not limited to this aspect, and the guide 35 may be fixed in any manner. Unless otherwise specified, any simple reference to an extending direction of the guide 35 below means the extending direction (in FIG. 1 and FIG. 2, the lateral direction) of the linearly formed guide 35 as depicted in FIG. 1 and FIG. 2.

Figure 3:
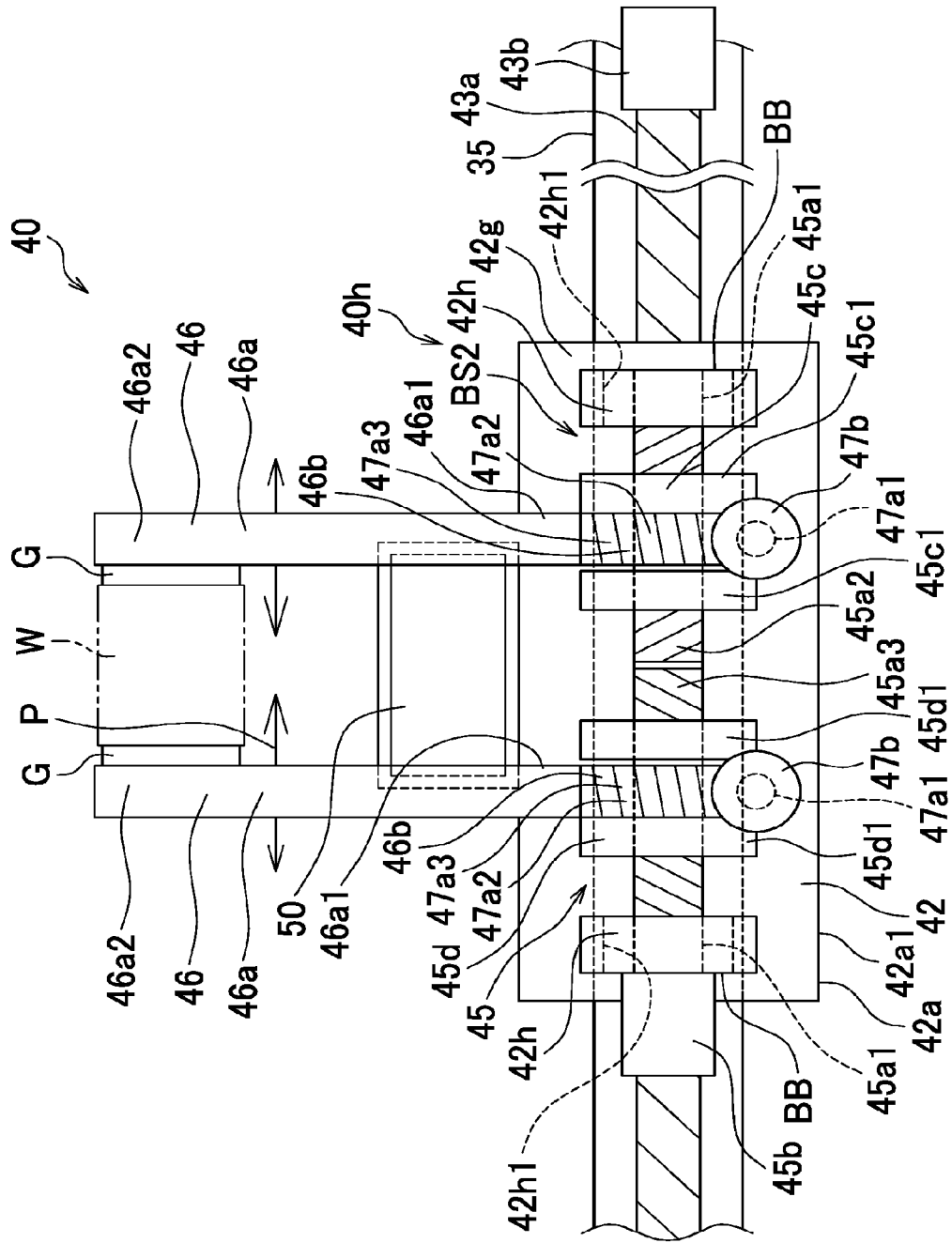
FIG. 3 is an enlarged plan view of the conveying apparatus depicted in FIG. 1.
Figure 4:
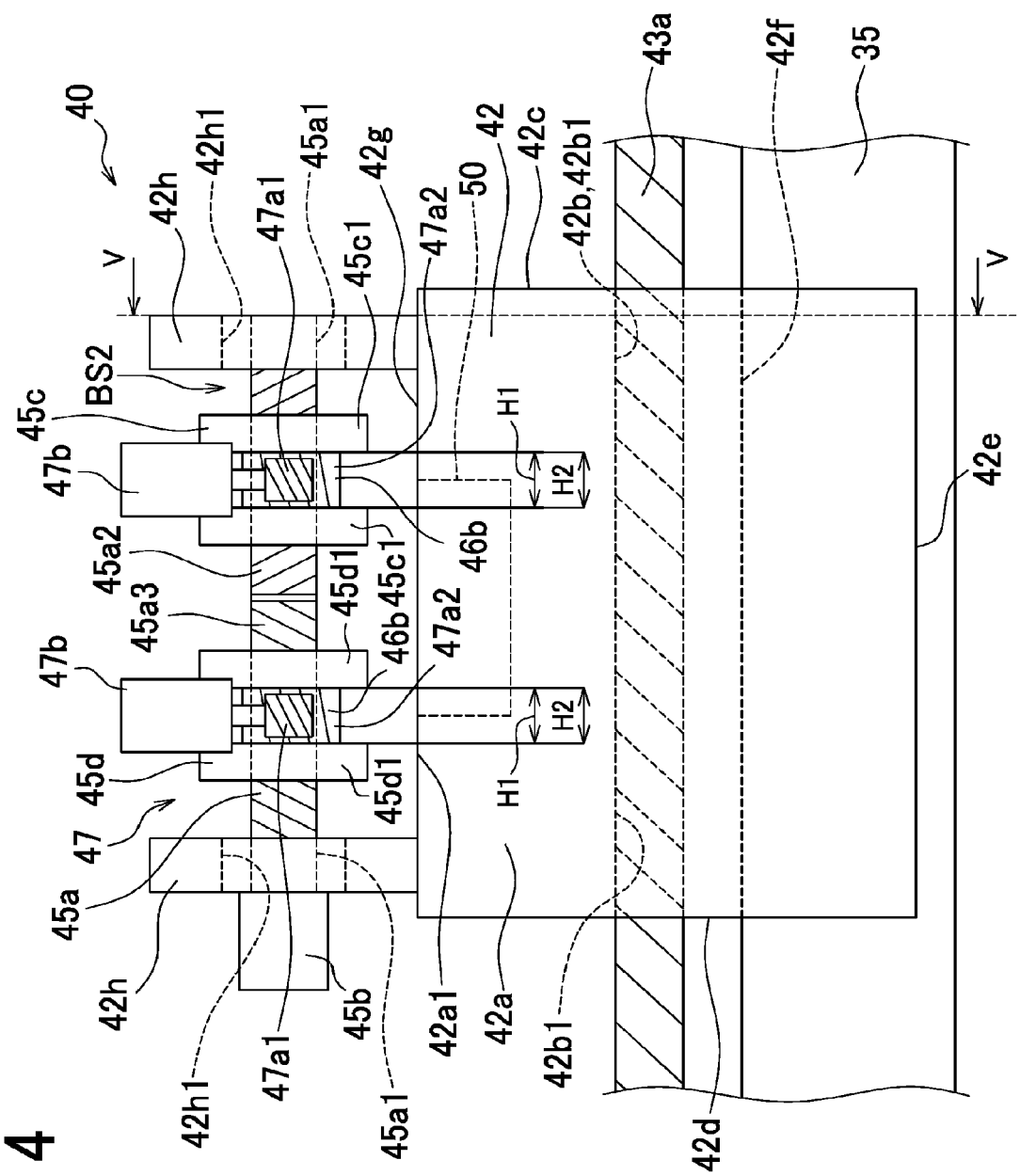
FIG. 4 is an enlarged front view of the conveying apparatus depicted in FIG. 2.

As depicted in FIG. 3 and FIG. 4, the conveying unit 40 includes a body 42, a movement driving unit 43, a sandwich driving unit 45, the two arms 46, 46, and a turn driving unit 47. In the conveying unit 40, the body 42, engaged with the guide 35, is guided in the extending direction of the guide 35 (see FIG. 1).

The body 42 is a base portion of the conveying unit 40. The body 42 is formed of metal, for example, aluminum or iron. However, the illustrated materials are only examples, and the invention is not limited to these materials. The body 42 is shaped generally like a rectangular parallelepiped. As depicted in FIG. 3 and FIG. 4, the body 42 is arranged such that a long side 42a1 of a side surface 42a of the rectangular parallelepiped is generally parallel to the extending direction of the guide 35. The shape of the illustrated body 42 is only an example, and the body 42 may have any shape.

As depicted in FIG. 3 and FIG. 4, the body 42 has a through-hole 42b extending parallel to the guide 35. The through-hole 42b penetrates side surfaces 42c and 42d of the body 42 that are orthogonal to the extending direction of the guide 35 and that are opposite to each other. An internal thread 42b1 of a first ball screw mechanism BS1 described below is formed on an inner peripheral surface of the through-hole 42b. The body 42 also has a groove 42f that is formed in a lower surface 42e and that engages with the guide 35 so as to be movable relative to the guide 35. The groove 42f is formed under and parallel to the through-hole 42b (FIG. 2, FIG. 4).

The body 42 includes two protruding portions 42h, 42h on an upper surface 42g. The protruding portions 42h, 42h are provided at a predetermined distance from each other in the extending direction of the guide 35. The protruding portions 42h, 42h support the two arms 46, 46 via a second ball screw mechanism BS2 described below. Specifically, as depicted in FIG. 3 and FIG. 4, base ends 46a1, 46a1 on base end sides of the two arms 46, 46 are supported by a second bolt 45a of the second ball screw mechanism BS2 included in the sandwich driving unit 45 described below, via a plurality of balls (not depicted in the drawings) and nuts 45c, 45d such that the arms 46, 46 are rotatable relative to the second bolt 45a.

The groove 42f and the guide 35 are arranged near the base ends 46a1, 46a1 of the two arms 46, 46 (see FIG. 1). In the protruding portions 42h, 42h, through-holes 42h1, 42h1 are formed which have axes common to each other and parallel to the extending direction of the guide 35. Outer laces of ball bearings BB are fitted in the through-holes 42h1, 42h1. The second bolt 45a of the second ball screw mechanism BS2 described above is inserted through inner laces of the ball bearings BB at opposite ends of the second bolt 45a and rotatably supported.

The movement driving unit 43 is a driving unit that moves the body 42 in the extending direction of the guide 35 with respect to the guide 35. The movement driving unit 43 may have any structure. An example configuration includes the first ball screw mechanism BS1, a first motor 43b, and a displacement sensor 43c that detects a relative position of the body 42 relative to the guide 35. In this case, the first ball screw mechanism BS1 includes the above-described internal thread 42b1 formed in the body 42, a first bolt 43a screw-threaded with the internal thread 42b1, and the balls (not depicted in the drawings) interposed between the internal thread 42b1 and the first bolt 43a.

As depicted in FIG. 1 and FIG. 2, the first motor 43b is fixed to a component other than the body 42, for example, an end of the guide 35. The first motor 43b is a servo motor. An I/O terminal of the first motor 43b is electrically connected to the control apparatus 70 (see FIG. 1). The rotation angle of an output shaft, not depicted in the drawings, of the first motor 43b is controlled in accordance with commands from the control apparatus 70. The output shaft of the first motor 43b is fixed to an end of the first bolt 43a protruding from the body 42, and rotates integrally with the first bolt 43a.

The displacement sensor 43c is fixed to an end of the body 42. The displacement sensor 43c detects a relative position in the extending direction of the body 42 with respect to the guide 35. The displacement sensor 43c is connected to the control apparatus 70. Data detected by the displacement sensor 43c is transmitted to the control apparatus 70. This enables determination of the position of the body 42 in the extending direction of the guide 35, that is, the relative position of the conveying unit 40 relative to the guide 35.

If any difference is present between the relative position of the conveying unit 40 and the desired position thereof, the control apparatus 70 calculates a correction value that allows the difference to be eliminated based on the data detected by the displacement sensor 43c. The control apparatus 70 then transmits a command value corresponding to the correction value to the first motor 43b. The control apparatus 70 thus actuates the first motor 43b to feedback-control the position of the conveying unit 40 so as to adjust the position to the desired position. The displacement sensor 43c may be based on any system based on eddy current, optics, ultrasonic wave, or contact.

The sandwich driving unit 45 is a driving unit that varies the separation distance between the paired two arms 46, 46 to allow the workpiece W to be sandwiched between leading ends 46a2, 46a2 of the arms 46, 46 under a predetermined load P at which the workpiece W can be lifted. The sandwich driving unit 45 may have any structure. An example structure includes the above-described second ball screw mechanism BS2 and a second motor 45b (see FIG. 3 and FIG. 4).

The second ball screw mechanism BS2 includes the second bolt 45a, the second motor 45b, and two nuts 45c, 45d. The second bolt 45a includes bearing support portions 45a1, 45a1 provided at opposite ends of the second bolt 45a, and a first external thread 45a2 and a second external thread 45a3 both formed between the bearing support portions 45a1, 45a1. The first and second external threads 45a2, 45a3 are formed to have opposite rotating directions. The first and second external threads 45a2, 45a3 are formed to have substantially the same length. Between the first and second external threads 45a2, 45a3 of the second bolt 45a, a non-thread portion is provided on which no external thread is formed. The non-thread portion is referred to as a central portion of the second bolt 45a. The bearing support portions 45a1, 45a1 are supported by the protruding portions 42h, 42h via the ball bearings BB so as to be rotatable relative to the protruding portions 42h, 42h.

The second motor 45b is a servo motor having an I/O terminal electrically connected to the control apparatus 70. The rotation angle of an output shaft (not depicted in the drawings) of the second motor 45b is controlled in accordance with commands from the control apparatus 70. The second motor 45b is fixed to a side surface of one of the protruding portions 42h of the body 42 as depicted in FIG. 3 and FIG. 4. The output shaft (not depicted in the drawings) of the second motor 45b is fixed to one end of the second bolt 45a protruding from the one of the protruding portions 42h in a direction away from the central portion of the external thread portion. The output shaft of the second motor 45b rotates integrally with the second bolt 45a.

As depicted in FIG. 3 and FIG. 4, with inner peripheries of the two nuts 45c, 45d screw-threaded with the first and second external threads 45a2, 45a3, rotation of the nuts 45c, 45d is regulated by a predetermined unit (not depicted in the drawings). The internal threads of the nuts 45c, 45d are formed such that, in the above-described state, rotation of the second bolt 45a around the axis thereof moves the two nuts 45c, 45d closer to or away from each other. The two nuts 45c, 45d include flange portions 45c1, 45c1 and flange portions 45d1, 45d1, respectively, such that the flange portions of each nut are located on opposite sides of the second bolt 45a in an axial direction thereof. The two nuts 45c, 45d are desirably consistently arranged at an equal distance from the central portion of the second bolt 45a.

As depicted in FIG. 3 and FIG. 4, the two arms 46, 46 include sandwiching portions 46a, 46a and circular ring portions 46b, 46b. The sandwiching portions 46a, 46a are long prismatic members. As described above, base ends of the sandwiching portions 46a, 46a, located closer to the body 42, are referred to as the base ends 46a1, 46a1. Leading ends of the sandwiching portions 46a, 46a, located opposite to the base ends 46a1, 46a1, are referred to as the leading ends 46a2, 46a2.

The plate thickness and shape of each of the sandwiching portions 46a, 46a are such that, after the workpiece W is sandwiched between the leading ends 46a2, 46a2, located on the opposite sides of the workpiece W, under the predetermined load P, the sandwiching portions 46a, 46a are rigid (strong) enough to be prevented from being deflected when the arms 46, 46 with the workpiece W remaining sandwiched therebetween are turned around the axis of the second bolt 45a to lift the workpiece W in a cantilever manner. The shape and the plate thickness are predetermined through calculations and experiments. In this case, to prevent the workpiece W from slipping down from the sandwiching portions 46a, 46a, high-friction materials G are stuck to the leading ends 46a2, 46a2 of the sandwiching portions 46a, 46a so as to be interposed between the workpiece W and the leading ends 46a2, 46a2.

The circular ring portions 46b, 46b are shaped like circular rings and connected to the base ends 46a1, 46a1 of the sandwiching portions 46a, 46a. Inner peripheral surfaces of the circular ring portions 46b, 46b engage, in a relatively rotatable manner, with cylindrical outer peripheral surfaces of the two nuts 45c, 45d screw-threaded with the external threads 45a2, 45a3 of the second bolt 45a of the sandwich driving unit 45. At this time, a relation H2>H1 is present between the width H1 between the circular ring portions 46b, 46b in the axial (turning axis) direction of the second bolt 45a and the width H2 between outer peripheral surfaces of each of the nuts 45c, 45d in the axial (turning axis) direction, that is, the width H2 between inner sides of the flange portions 45c1, 45c1 of the nuts 45c, 45d and between inner sides of the flange portions 45d1, 45d1. Consequently, the circular ring portions 46b, 46b of the arms 46, 46 are rotatable relative to the outer peripheral surfaces of the nuts 45c, 45d.

Figure 5:
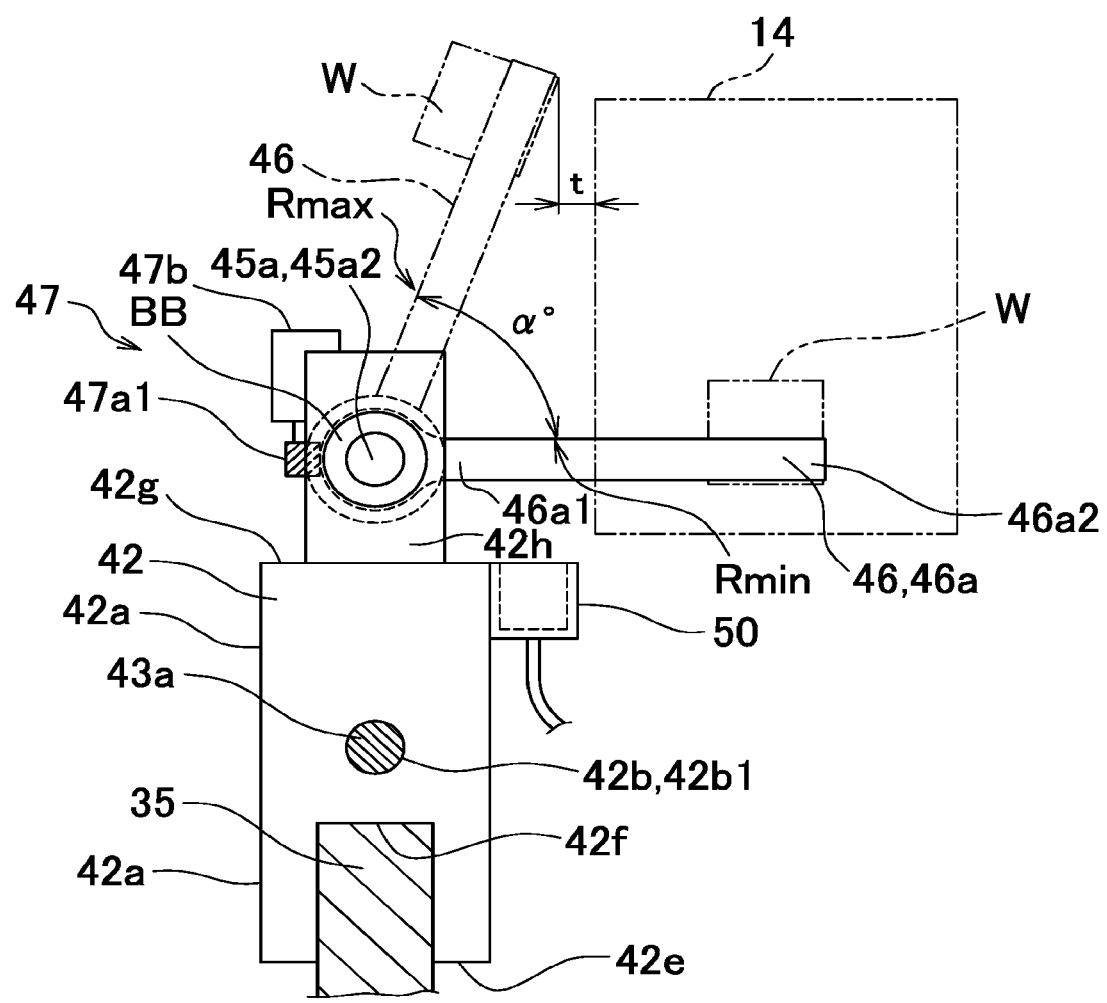
FIG. 5 is a sectional view taken along line V-V in FIG. 4.

In the present embodiment, the turning angle through which the circular ring portions 46b, 46b are rotatable, that is, the turning angle through which the arms 46, 46 are rotatable, is regulated within the range from Rmin to Rmax by a stopper not depicted in the drawings, as depicted in FIG. 5. Rmin denotes the position of the arms 46, 46 in a turning direction at which the workpiece W can be sandwiched between the leading ends 46a2, 46a2 of the arms 46, 46 when mounted at the pre-loading wait position Pwb during loading of the workpiece W or at the processing position Pp during unloading of the workpiece W. Rmax is the position of the arms 46, 46 resulting from turning of the arms 46, 46 located at the Rmin position around a turning shaft through a predetermined turning angle $\alpha°$.

When the second bolt 45a is rotated with rotation of the nuts 45c, 45d regulated, the nuts 45c, 45d are moved in one direction along the axial direction with respect to the second bolt 45a. Consequently, the flange portions 45c1, 45c1 and the flange portions 45d1, 45d1 of the nuts 45c, 45d press side surfaces of the circular ring portions 46b, 46b of the arms 46, 46 in directions in which the nuts 45*c*, 45*d* move, respectively. The nuts 45*c*, 45*d* move the arms 46, 46 in these moving directions. At this time, the nuts 45*c*, 45*d* consistently move in the opposite directions along the axial direction of the second bolt 45*a*. Thus, the arms 46, 46 move so as to increase or reduce the separation distance between the arms 46, 46 according to the rotating direction of the second bolt 45*a* around the axis thereof.

To allow the workpiece W to be sandwiched between the leading ends 46*a*2, 46*a*2 of the arms 46, 46, the second bolt 45*a* is rotated in such a rotating direction as to reduce the separation distance between the arms 46, 46. To release the sandwiching of the workpiece W between the leading ends 46*a*2, 46*a*2 of the arms 46, 46, the second bolt 45*a* is rotated in such a rotating direction as to increase the separation distance between the arms 46, 46.

Specifically, to allow the workpiece W to be sandwiched between the leading ends 46*a*2, 46*a*2 of the arms 46, 46, the second motor 45*b* is controlled using a preset current value to change and reduce the separation distance between the arms 46, 46, allowing the workpiece W to be sandwiched under the predetermined load P. A relation is determined through preliminary evaluation between the predetermined load P at which the workpiece W can be lifted and a corresponding current value. At this time, of course, a necessary condition is that all design specifications have been satisfied, such as the rigidity of the arms and a coefficient of friction between a contact surface of the workpiece W and a contact surface of each of the arms 46, 46, the specifications being needed to enable the workpiece W to be lifted.

In the above-described configuration, the circular ring portions 46*b*, 46*b* of the arms 46, 46 may be assembled to the outer peripheral surfaces of the nuts 45*c*, 45*d* in any manner. For example, among the flange portions 45*c*1, 45*c*1 of the nut 45*c* and the flange portions 45*d*1, 45*d*1 of the nut 45*d*, at least one flange portion 45*c*1 and one flange portion 45*d*1 may be removed. The circular ring portions 46*b*, 46*b* of the arms 46, 46 may then be inserted from the sides of the removed flange portions 45*c*1 and 45*d*1. The removed flange portions 45*c*1, 45*c*1 may then be assembled back to the circular ring portions 46*b*, 46*b*.

The turn driving unit 47 is a driving unit that actuates and moves the leading ends 46*a*2, 46*a*2 of the two arms 46, 46 upward or downward with the workpiece W sandwiched between the leading ends 46*a*2, 46*a*2 under the predetermined load P as a result of actuation of the sandwich driving unit 45. In other words, the turn driving unit 47 turns the two arms 46, 46 through the predetermined turning angle α° around the axis (corresponding to the predetermined turning shaft) of the second bolt 45*a*, provided closer to the base ends 46*a*1, 46*a*1 of the arms 46, 46. The turn driving unit 47 also has a function to turn through the predetermined turning angle α° to maintain the state of the arms 46, 46 with the workpiece W kept lifted thereby. The turn driving unit 47 may have any configuration, and for example, includes worm gears 47*a* and third motors 47*b*.

The turn driving unit 47 is provided on each of the arms 46, 46. The worm gears 47*a*, 47*a* of the turn driving units 47 include worms 47*a*1, 47*a*1 and worm wheels 47*a*2, 47*a*2, respectively. The worm wheels 47*a*2, 47*a*2 are also used as the circular ring portions 46*b*, 46*b* of the arms 46, 46. In other words, on outer peripheral surfaces of the circular ring portions 46*b*, 46*b* (worm wheels 47*a*2, 47*a*2), tooth portions 47*a*3, 47*a*3 of the worm wheels 47*a*2, 47*a*2 are formed.

The worms 47*a*1, 47*a*1 are provided at tips of output shafts of the third motors 47*b*, 47*b*. Tooth portions of the worms 47*a*1, 47*a*1 mesh with the tooth portions 47*a*3, 47*a*3 of the worm wheels 47*a*2, 47*a*2. The third motors 47*b*, 47*b* are, for example, fixed to the set of the flange portions 45*c*1, 45*c*1 and the set of the flange portions 45*d*1, 45*d*1, respectively, of the nuts 45*c*, 45*d* provided in the second ball screw mechanism BS2. The third motors 47*b*, 47*b* are servo motors and have I/O terminals electrically connected to the control apparatus 70. The third motors 47*b*, 47*b* are controlled to synchronize with each other.

When the output shafts (not depicted in the drawings) of the third motors 47*b*, 47*b* are synchronously controlled in accordance with a command from the control apparatus 70, the worms 47*a*1, 47*a*1 are rotated to relatively rotate the tooth portions 47*a*3, 47*a*3 of the worm wheels 47*a*2, 47*a*2 with which the worm 47*a*1, 47*a*1 are meshed. Then, the arms 46, 46 are turned around the turning shaft in the direction in which the arms 46, 46 are lifted or lowered. This worm wheel mechanism has a high gear ratio and is thus structured such that even a possible reverse input from the arms 46, 46 is less likely to reversely rotate the worms 47*a*1, 47*a*1. Thus, the worm wheel mechanism suitably holds the lifted arms 46, 46.

The receiving member 50 is a member that receives coolant falling down from the workpiece W. Specifically, the receiving member 50 is a member that receives coolant falling down from the workpiece W while the two arms 46, 46 are being turned around the turning shaft under the control of the control apparatus 70 to lift up the workpiece W sandwiched between the arms 46, 46 as depicted in FIG. 3 and FIG. 5. At this time, the workpiece W is tilted according to the turning angle of the two arms 46, 46 while being lifted, and the tilt causes coolant to fall down from the workpiece W.

The receiving member 50 has any configuration so long as the receiving member 50 is a container that is open at the top thereof. The receiving member 50 is arranged at a position on the body 42 depicted in FIG. 3 and FIG. 5. The exact position where the receiving member 50 is arranged may be determined through preliminary evaluation. On a lower surface of the receiving member 50, a pipe is provided through which coolant stored in the receiving member 50 is guided to an oil tank not depicted in the drawings. The coolant is cutting oil supplied to the machining processing portion when the workpiece W is machined. The receiving member 50 may be attached to one of the two arms 46, 46. The receiving member 50 may be omitted.

As depicted in FIG. 1 and FIG. 2, the opening door 60 is a door that can be opened and closed and that is provided at an opening between the first side wall 14 and the second side wall 15 to serve as a doorway through which the workpiece W is transferred to and from the processing position Pp. The opening door 60 is opened and closed when the workpiece W is loaded and transferred to the processing position Pp and when the workpiece W is unloaded and transferred from the processing position Pp. The opening door 60 is opened and closed by an air cylinder actuated under the control of the control apparatus 70 and not depicted in the drawings.

Specifically, during loading of the workpiece W, the opening door 60 is opened when the arms 46, 46, kept lifted after being turned through the predetermined tuning angle α°, lower to mount the workpiece W sandwiched between the arms 46, 46 at the processing position Pp. The opening door 60 is closed after the arms 46, 46 independently turn in the lifting direction and retract through the opening after mounting the workpiece W at the processing position Pp. The opening door 60 is also opened when, after the end of machining processing of the workpiece W at the processing position Pp, the arms 46, 46 turn and lower toward the processing position Pp through the opening in order to unload and transfer the workpiece W from the processing position Pp.

In the present embodiment, the lowering allows the opening door 60 to be opened, and the lifting allows the opening door 60 to be closed. However, the invention is not limited to this aspect. The opening door 60 may be opened and closed in any manner. For example, the opening door 60 may be opened by rightward or leftward movement and closed by movement in the direction opposite to the direction for opening.

Figure 6:
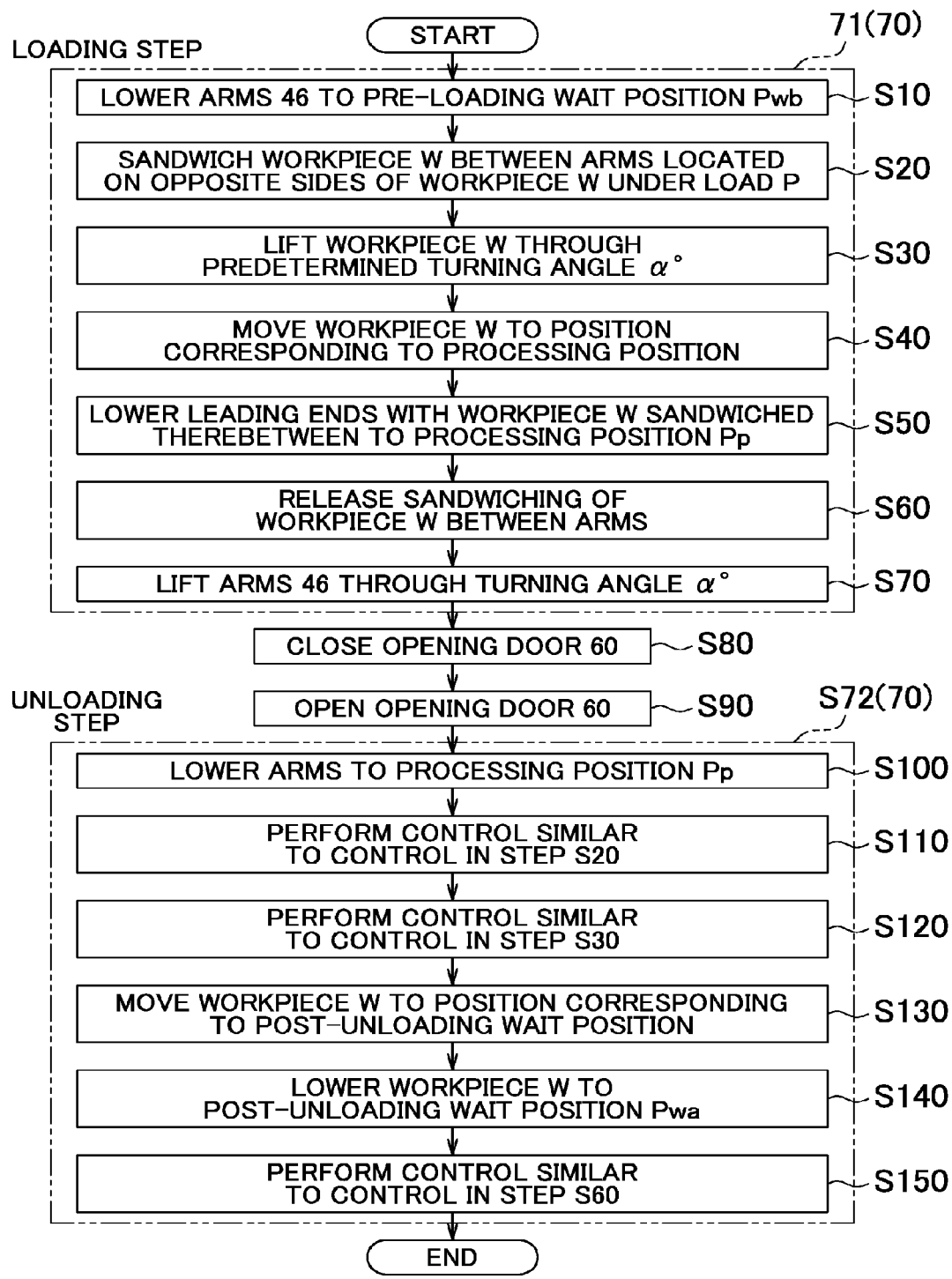
FIG. 6 is a flowchart of operations of the conveying apparatus.

As depicted in FIG. 6, the control apparatus 70 includes a loading control unit 71 and an unloading control unit 72. The loading control unit 71 is a control unit that controls a loading step of loading and transferring the workpiece W mounted at the pre-loading wait position Pwb (wait position; corresponding to one position) to the processing position Pp (corresponding to the other position). The unloading control unit 72 is a control unit that controls an unloading step of unloading and transferring the workpiece W machined and located at the processing position Pp (corresponding to one position) to the post-unloading wait position Pwa (wait position; corresponding to the other position) The loading control unit 71 and the unloading control unit 72 include a common movement control unit 73, a common sandwich control unit 74, and a common turn control unit 75. The loading control unit 71 and the unloading control unit 72 commonly include an opening control unit (not depicted in the drawings) that controls opening and closing of the opening door 60.

The movement control unit 73 controls the movement driving unit 43 to move the body 42 of the conveying unit 40 in the extending direction of the guide 35 relative to the guide 35. The movement control unit 73 moves the body 42 to a position facing the pre-loading wait position Pwb, the processing position Pp, or the post-unloading wait position Pwa.

The sandwich control unit 74 controls the sandwich driving unit 45 to change the separation distance between the paired two arms 46, 46 to sandwich the workpiece W between the arms 46, 46 or to release the sandwiching of the workpiece W.

The turn control unit 75 controls the turn driving unit 47 to turn the two arms 46, 46 around the turning shaft to lift or lower the leading ends of the arms 46, 46 between the Rmin position and the Rmax position. As described above, Rmin denotes the position (angle) of the arms 46, 46 in the turning direction at which the workpiece W can be sandwiched between the arms 46, 46 when mounted at the pre-loading wait position Pwb during loading of the workpiece W or at the processing position Pp during unloading of the workpiece W.

At the Rmin position, a predetermined unit is used to regulate the turning (rotation) of the arms 46, 46 so as to prevent a further reduction in turning angle. Rmax denotes a position (angle) resulting from turning through the predetermined turning angle $\alpha°$ from the Rmin position. In the present embodiment, the predetermined turning angle $\alpha°$ is, for example, 90° or less. For the Rmax position, a predetermined unit is used to regulate the turning (rotation) so as to prevent a further increase in turning angle. The regulation of the turning at the Rmin and Rmax positions may be omitted.

The above-described predetermined turning angle $\alpha°$ is the turning angle at which, when the workpiece W lifted by the arms 46, 46 moves in the extending direction of the guide 35, the arms 46, 46 and the workpiece W can pass through a space located in front of the first side wall 14 and the second side wall 15 (the lower side in FIG. 1, and the left side in FIG. 5) and closer to the base ends of the arms 46, 46 than the first side wall 14 and the second side wall. The predetermined turning angle is an angle preset based on preliminary examinations.

Now, operations of the conveying apparatus 31 in the production line 10 will be described based on a flowchart in FIG. 6. As a precondition for the description of the operations, the workpiece W not machined yet is assumed to be mounted and prepared at the pre-loading wait position Pwb of the first machine tool 11. Mounting of the workpiece W at the pre-loading wait position Pwb of the first machine tool 11 may be performed by an operator or another conveying apparatus. At this time, the opening door 60 is open. The arms 46, 46 are stopped after being lifted by turning around the turning shaft through the predetermined turning angle $\alpha°$ (see a long dashed double-short dashed line in FIG. 5). In this state, start switches for the production line 10 and the conveying apparatus 31 are turned on to start machining.

In the loading step in the present embodiment, the workpiece W mounted at the pre-loading wait position Pwb (at this time, a wait position corresponding to one position) of the first machine tool 11 is loaded and transferred to the processing position Pp in the first machine tool 11. For this purpose, in step S10, the turn control unit 75 (loading control unit 71) controls the third motors 47b, 47b of the turn driving units 47, 47 to rotate the worms 47a1, 47a1 around the rotation axes of the third motors 47b, 47b. Consequently, the worm wheels 47a2, 47a2 (circular ring portions 46b, 46b) having the tooth portions 47a3, 47a3 that mesh with the worms 47a1, 47a1 are rotated around the turning shaft (coinciding with the axis of the second bolt 45a). Then, at the above-described Rmin position, the arms 46, 46 turn and lower until the arms 46, 46 come into contact with the stopper not depicted in the drawings (see FIG. 5).

In step S20, the sandwich control unit 74 (loading control unit 71) controls the second motor 45b of the sandwich driving unit 45 to actuate the second ball screw mechanism BS2. Consequently, the separation distance between the lowered arms 46, 46 is reduced to allow the workpiece W mounted at the pre-loading wait position Pwb to be sandwiched, under the predetermined load P, between the arms 46, 46 located on the opposite sides of the workpiece W. At this time, the predetermined load P is controlled in accordance with the value of a current applied to the second motor 45b. In this case, the high-friction materials G, G may be each interposed between a corresponding one of the opposite side surfaces of the workpiece W and a corresponding one of the leading ends 46a2, 46a2 of the arms 46, 46. This restrains the workpiece W from slipping down from the sandwiching portions 46a, 46a.

In step S30, with the workpiece W sandwiched between the arms 46, 46 under the predetermined load P, the turn control unit 75 (loading control unit 71) controls the third motors 47b, 47b of the turn driving units 47, 47 to be rotated in the direction opposite to the direction in step S10. Consequently, the arms 46, 46 are lifted by being turned around the turning shaft through the predetermined turning angle $\alpha°$. At this time, a clearance t is formed between the first side wall 14 and the workpiece W lifted by being turned through the predetermined turning angle $\alpha°$. Thus, when moving in the extending direction of the guide 35, the workpiece W lifted by the arms 46, 46 can move without coming into contact with the first side wall 14 along with the arms 46, 46.

In step S40, with the workpiece W lifted, the movement control unit 73 (loading control unit 71) controls the first motor 43b of the movement driving unit 43 to actuate the first ball screw mechanism BS1. Consequently, the body 42 of the conveying unit 40 is moved in the extending direction of the guide 35 (in FIG. 1, leftward) relative to the guide 35 to move the arms 46, 46 and the workpiece W to a position corresponding to the processing position Pp (corresponding to the other position) in the extending direction of the guide 35.

As described above, in spite of the fixed first side wall 14 installed between the pre-loading wait position Pwb and the processing position Pp to prevent chips and the like from scattering around when the workpiece W is machined, the turning operation of the arms 46, 46 allows the workpiece W to avoid coming into contact with the first side wall 14 and to move from the pre-loading wait position Pwb to the processing position Pp. At this time, the distance the workpiece W moves in the extending direction of the guide 35 is calculated based on the rotation angle of the first motor 43b and controlled based on the calculation result.

In step S50, the turn control unit 75 (loading control unit 71) actuates and rotates the worms 47a1, 47a1 to turn the arms 46, 46 around the turning shaft to lower the workpiece W. That is, the workpiece W is passed through the opening between the first side wall 14 and the second side wall 15 and lowered to a height at which the workpiece W can be mounted at the processing position Pp (corresponding to the other position). The workpiece W is then mounted at the processing position Pp. At this time, the opening door 60 provided at the opening is controlled and kept open by the control apparatus 70.

In step S60, after the workpiece W is mounted at the processing position Pp (corresponding to the other position), the sandwich control unit 74 (loading control unit 71) controls the second motor 45b of the sandwich driving unit 45 to be rotated in the direction opposite to the direction in which the second motor 45b is rotated to sandwich the workpiece W between the arms 46, 46. Consequently, the separation distance between the arms 46, 46 is increased to release the sandwiching of the workpiece W between the arms 46, 46.

In step S70, the turn control unit 75 (loading control unit 71) controls the arms 46, 46 to be lifted with no workpiece W sandwiched therebetween by turning the arms 46, 46 around the turning shaft through the predetermined turning angle α°. Thus, when the workpiece W is machined at the processing position Pp, the arms 46, 46 are reliably prevented from obstructing the machining processing. In the present embodiment, the arms 46, 46 are lifted through the predetermined turning angle α° to allow the machining processing to be reliably executed on the workpiece W. However, the invention is not limited to this aspect. So long as the arms 46, 46 can be prevented from obstructing the machining processing, the lifting angle is not limited to α° but may be set to any degree.

In step S80, the arms 46, 46 stick out from the opening, and the opening door 60 is closed under the control of the control apparatus 70. Then, the first machine tool 11 clamps and fixedly positions the workpiece W, and the workpiece W is machined using the rotary tool 25. At this time, the machining processing is executed while a coolant having a cooling function and a lubrication function is being fed to the rotary tool 25 and the workpiece W. When the machining processing of the workpiece W ends, the opening door 60 is opened under the control of the control apparatus 70 in step S90.

An unloading step will be described. In step S100, the turn control unit 75 (unloading control unit 72) controls the turn driving unit 47 to turn the arms 46, 46 again, lowering the arms 46, 46 to the Rmin position corresponding to the processing position Pp.

In step S110, the sandwich control unit 74 (unloading control unit 72) performs control similar to the control in step S20. In other words, the sandwich control unit 74 performs control to sandwich the workpiece W mounted and machined at the processing position Pp (at this time, corresponding to one position in the unloading control unit 72) between the arms 46, 46 located on the opposite sides of the workpiece W under the predetermined load P.

In step S120, the turn control unit 75 (unloading control unit 72) performs control similar to the control in step S30. In other words, the turn control unit 75 controls the arms 46, 46 to be lifted with the workpiece W sandwiched therebetween under the predetermined load P by turning the arms 46, 46 around the turning shaft through the predetermined turning angle α°. At this time, coolant used during machining processing may remain mainly on the upper surface of the workpiece W.

Thus, in applications in which the arms 46, 46 and the workpiece W are lifted by being turned around the turning shaft through the turning angle α°, coolant remaining mainly on the upper surface of the workpiece W falls down as the workpiece W tilts in conjunction with tilt of the arms 46, 46. However, the conveying apparatus 31 includes the receiving member 50 that is open at the top thereof and that is located at a position where the coolant is expected to fall down (see FIG. 3 and FIG. 5). Therefore, the falling coolant is retrieved through the opening at the top of the receiving member 50 and efficiently collected in the oil tank (not depicted in the drawings) through the pipe provided on the receiving member 50.

In step S130, the movement control unit 73 (unloading control unit 72) performs control similar to the control in step S40. In other words, with the workpiece W lifted by being turned through the predetermined angle α°, the arms 46, 46 and the workpiece W are controlled by the movement control unit 73 and move from a position corresponding to the processing position Pp in the extending direction of the guide 35 to a position corresponding to the post-unloading wait position Pwa so as not to come into contact with the second side wall 15. At this time, the distance the workpiece W moves in the extending direction of the guide 35 is calculated based on the rotation angle of the first motor 43b and controlled based on the calculation result.

In step S140, the turn control unit 75 (unloading control unit 72) performs control similar to the control in step S50 to lower the workpiece W. In other words, the turn control unit 75 performs control to turn and lower the workpiece W to a height at which the workpiece W can be mounted at the post-unloading wait position Pwa (wait position corresponding to the other position in the unloading control unit 72) and then mounts the workpiece W at the post-unloading wait position Pwa.

In step S150, after the workpiece W is mounted at the post-unloading wait position Pwa (corresponding to the other position), the sandwich control unit 74 (unloading control unit 72) performs control similar to the control in step S60. In other words, the sandwich control unit 74 controls and actuates the second ball screw mechanism BS2 to increase the separation distance between the arms 46, 46 to release the sandwiching of the workpiece W between the arms 46, 46.

The arms 46, 46 may subsequently wait in the state where the arms 46, 46 are when step S150 ends. Alternatively, the arms 46, 46 may wait while being kept lifted through the turning angle α°. In step S150, the release of sandwiching of the workpiece W between the arms 46, 46 may be omitted so as to allow the workpiece W to be immediately supplied to the second machine tool 12.

In and after step 150 in the production line 10, the conveying apparatus 31 executes processing similar to the processing from steps S10 to S150 described above on the second machine tool 12. At this time, in the conveying apparatus 31, the post-unloading wait position Pwa of the first machine tool 11 is the same as the pre-loading wait position Pwb of the second machine tool 12; the same position is used both as the post-unloading wait position Pwa of the first machine tool 11 and as the pre-loading wait position Pwb of the second machine tool 12. The above-described processing also applies to the third machine tool 13. When the above-described processing in steps S10 to S150 in the second machine tool 12 ends, the conveying apparatus 31 executes processing similar to the processing in steps S10 to S150. Also in this case, the post-unloading wait position Pwa of the second machine tool 12 is the same as the pre-loading wait position Pwb of the third machine tool 13; the same position is used both as the post-unloading wait position Pwa of the second machine tool 12 and as the pre-loading wait position Pwb of the third machine tool 13.

However, the invention is not limited to this aspect, and instead of using the same position both as the post-unloading wait position Pwa of the first or second machine tool 11 or 12 and as the pre-loading wait position Pwb of the second or third machine tool 12 or 13, it is also preferable to use different positions as the post-unloading wait position Pwa of the first or second machine tool 11 or 12 and the pre-loading wait position Pwb of the second or third machine tool 12 or 13. In this case, the operator may manually move the workpiece W between the post-unloading wait position Pwa of the first or second machine tool 11 or 12 and the pre-loading wait position Pwb of the second or third machine tool 12 or 13. Alternatively, the workpiece W may be conveyed using another conveying apparatus.

In the above-described embodiment, the conveying apparatus 31 is used for the machine tools 11 to 13 (processing apparatuses) that execute machining (predetermined processing) on the workpiece W (article) mounted at the processing position Pp, and conveys the workpiece W (article) between the pre-loading wait position Pwb (wait position, one position) and the processing position Pp (the other position) or between the processing position Pp (one position) and the post-unloading wait position Pwa (the other position).

The conveying apparatus 31 includes the two arms 46, 46 that are movable between the wait position (pre-loading wait position Pwb or post-unloading wait position Pwa) and the processing position Pp and that sandwich the workpiece W between the leading ends 46a2, 46a2 on the leading end sides of the arms 46, 46, the arms being provided so as to make the separation distance between the arms 46, 46 variable and to enable the base ends 46a1, 46a1 on the base end sides of the arms 46, 46 to turn so as to move the leading ends 46a2, 46a2 in the up-down direction.

The conveying apparatus 31 further includes the control apparatus 70 that turns the two arms 46, 46 to lift the workpiece W located at the pre-loading wait position Pwb (wait position) or processing position Pp that is one position and sandwiched between the two arms 46, 46 and that moves the two arms 46, 46 with the workpiece W kept lifted thereby to the processing position Pp or post-unloading wait position Pwa (wait position) that is the other position, the control apparatus turning the two arms 46, 46 to lower and mount the workpiece W at the processing position Pp or post-unloading wait position Pwa (wait position) that is the other position.

As described above, in the conveying apparatus 31, the workpiece W mounted at the pre-loading wait position Pwb (wait position) or the processing position Pp is sandwiched between the two arms 46, 46, and subsequently, the two arms 46, 46 turn to lift the workpiece W in the air. Then, the lifted workpiece W is moved toward the processing position Pp or post-unloading wait position Pwa that is the other position. After the movement, the two arms 46, 46 are turned to lower the workpiece W. Subsequently, the workpiece W is mounted at the processing position Pp or post-unloading wait position Pwa (wait position) that is the other position.

Thus, for example, when a plurality of machine tools (processing apparatuses) is arranged to form a line and the conveying apparatus 31 conveys the workpiece W between the machine tools, a conveying path need not be formed by providing slide apparatuses, conveyors, and the like between the machine tools. Consequently, the line length is prevented from being affected. Therefore, a compact line with a small line length can be configured.

In the conveying apparatus 31, the turning operation of the two arms 46, 46 replaces the function of elevating and lowering operations of an elevating apparatus in the related art. In the related art, for example, to move the workpiece W between the pre-loading wait position Pwb (wait position) and the processing position Pp, engagement and disengagement between the workpiece W and the slide apparatus, which are needed to move the workpiece W in a horizontal direction, need to be performed using the elevating and lowering operations of the elevating apparatus.

However, in the present embodiment, the workpiece W sandwiched between the arms 46, 46 is lifted and conveyed by the arms 46, 46 performing the turning operation without being moved in the horizontal direction. This eliminates the need for the engagement between the workpiece W and the slide apparatus and thus for the elevating apparatus. Thus, the turning operation of the arms 46, 46, which is a simple operation of a simple configuration, can replace the elevating apparatus, which is expensive. Consequently, the conveying apparatus 31 can correspondingly be produced at low cost. The workpiece W remains separate from the pre-loading wait position Pwb (wait position) and the processing position Pp rather than being displaced while keeping in contact with the pre-loading wait position Pwb (wait position) and the processing position Pp. This prevents the workpiece W from being rubbed against the upper surface at the processing position Pp or the post-unloading wait position Pwa (wait position). Thus, the bottom surface of the workpiece W can be prevented from being damaged during conveyance of the workpiece W.

In the above-described embodiment, each of the machine tools 11 to 13 (processing apparatuses) includes the fixed first side wall 14 and the fixed second side wall 15 that define the space between the processing position Pp and the pre-loading wait position Pwb and the space between the processing position Pp and the post-unloading wait position Pwa (wait position), respectively and that are not allowed to be opened or closed. When moving the workpiece W from the pre-loading wait position Pwb (wait position) or processing position Pp (processing position) that is one position to the processing position Pp (processing position) or the post-unloading wait position Pwa (wait position) that is the other position, the control apparatus 70 turns the two arms 46, 46 with the workpiece W sandwiched therebetween and keeps the workpiece W lifted.

The control apparatus 70 moves the workpiece W kept lifted by the arms 46, 46 to the other position along with the two arms 46, 46 by passing the workpiece W and the two arms 46, 46 through the space defined to lie in front of the first side wall 14 and the second side wall 15 and located closer to the base ends of the two arms 46, 46 than the side walls. Consequently, the workpiece W can be moved between the processing position Pp and the pre-loading wait position Pwb and between the processing position Pp and the post-unloading wait position Pwa (wait position) even when the first side wall 14 and the second side wall 15 are not of a movable type that is expensive. This allows the machine tools 11 to 13 (processing apparatus) at low cost.

In the above-described embodiment, the wait position that is set on each of the opposite sides of the processing position Pp is the pre-loading wait position Pwb at which the workpiece W not subjected to the predetermined processing yet waits, and the post-unloading wait position Pwa at which the workpiece W having subjected to the predetermined machining processing at the processing position Pp waits. The side walls are the first side wall 14 and the second side wall 15 that define the space between the processing position Pp and the pre-loading wait position Pwb and the space between the processing position Pp and the post-unloading wait position Pwa, respectively.

The conveying apparatus 31 includes the opening door that is allowed to be opened and closed in the opening between the first side wall 14 and the second side wall 15 that serves as a doorway through which the workpiece W is transferred to or from the processing position Pp when the two arms 46, 46 are turned to lower the workpiece W so as to load and transfer the workpiece W to the processing position Pp or when the workpiece W is lifted to be unloaded and transferred from the processing position Pp.

The control apparatus 70 includes the loading control unit 71 that turns the two arms 46, 46 to lift the workpiece W located at the pre-loading wait position Pwb and sandwiched between the two arms 46, 46, moves the lifted workpiece W and the two arms 46, 46 to pass through the space in front of the first side wall 14 to the processing position Pp, and then turns the two arms 46, 46 to pass through the opening to lower and mount the workpiece W at the processing position Pp.

The control apparatus 70 includes the unloading control unit 72 that turns the two arms 46, 46 to lift the workpiece W located at the processing position Pp and sandwiched between the two arms 46, 46, allows the workpiece W to pass through the opening, moves the lifted workpiece W and the two arms 46, 46 to pass through the space in front of the second side wall 15 to the position corresponding to the post-unloading wait position Pwa, and then turns the two arms 46, 46 to lower and mount the workpiece W at the post-unloading wait position Pwa. As described above, the loading control unit 71 and the unloading control unit 72 enable the workpiece W to be automatically conveyed between the processing position Pp and the pre-loading wait position Pwb and between the processing position Pp and the post-unloading wait position Pwa (wait position). This reduces man-hours for which the operator is engaged in the machining of the workpiece W.

In the above-described embodiment, the conveying apparatus 31 includes the guide 35 arranged at the base ends of the two arms 46, 46 so as to extend between the post-unloading wait position Pwa of the third machine tool 13 and the pre-loading wait position Pwb of the first machine tool 11. The conveying apparatus 31 includes the body 42 that engages with the guide 35 so as to be movable in the extending direction of the guide 35 relative to the guide 35 and that supports the two arms 46, 46 at the base ends thereof. The conveying apparatus 31 includes the movement driving unit 43 controlled by the control apparatus 70 to move the body 42 in the extending direction with respect to the guide 35.

The conveying apparatus 31 includes the sandwich driving unit 45 controlled by the control apparatus 70 to change the separation distance between the two arms 46, 46 to sandwich the workpiece W between the leading ends of the two arms 46, 46 located at the opposite sides of the workpiece W, under the predetermined load P at which the workpiece W is enabled to be lifted. The conveying apparatus 31 further includes the turn driving unit 47 controlled by the control apparatus 70 to turn the two arms 46, 46 with the workpiece W sandwiched therebetween by the sandwich driving unit 45 under the predetermined load P around the predetermined turning shaft provided at the base ends of the two arms 46, 46 through the predetermined turning angle $\alpha°$ so as to move the leading ends of the two arms 46, 46 in the up-down direction and to maintain the state of the two arms 46, 46 resulting from turning through the predetermined turning angle $\alpha°$.

As described above, the body 42 is guided along the guide 35 to move in the extending direction to the pre-loading wait position Pwb, the processing position Pp, and the post-unloading wait position Pwa. Consequently, the body 42 (arms 46, 46 and workpiece W) can accurately reach the pre-loading wait position Pwb, the processing position Pp, and the post-unloading wait position Pwa in a short time.

In the above-described embodiment, the processing apparatuses are machine tools, and the article is the workpiece W. Application of the invention to the machine tools machining the workpiece W that tend to have a large line length is expected to be very effective to reduce the line length.

In the above-described embodiment, the conveying apparatus 31 includes the receiving member 50 that receives coolant falling down from the workpiece W lifted while being tilted according to the turning angle of the two arms 46, 46 when the arms 46, 46 with the workpiece W sandwiched therebetween are turned to lift up the workpiece W under the control of the control apparatus 70. Consequently, coolant can be efficiently retrieved, eliminating the need for another coolant receiving portion, piping, and the like that are used to collect coolant. This enables contribution to cost reduction.

In the above-described embodiment, only one conveying apparatus is provided for the three machine tools 11 to 13. However, the invention is not limited to this aspect. Three conveying apparatuses may be provided which correspond to the respective machine tools 11 to 13. This allows the conveying apparatus to efficiently perform an operation on the machine tools 11 to 13 at the same time. Alternatively, two or four or more conveying apparatuses may be provided. In this case, the number of machine tools corresponding to the conveying apparatuses varies according to the number of the conveying apparatuses.

In the above-described embodiment, the movement driving unit 43 of the conveying apparatus 31 is driven by the first ball screw mechanism BS1. However, the invention is not limited to this aspect. The movement driving unit 43 may be driven by any mechanism, for example, by a linear motor. Alternatively, a rack may be formed on the body 42 and a pinion that meshes with the rack may be actuated and rotated by a motor to move the body 42 in the extending direction of the guide 35.

In the above-described embodiment, the movement driving unit 43 has the displacement sensor 43*c*. However, the invention is not limited to this aspect. The displacement sensor 43*c* may be omitted from the movement driving unit 43. This configuration precludes feedback control of the moving distance based on data from the displacement sensor 43*c*. However, adequate effects can be produced without feedback control.

In the above-described embodiment, the guide 35 of the conveying apparatus 31 is linearly formed. However, the guide 35 need not necessarily be linear so long as the body 42 of the conveying unit 40 is movable between the pre-loading wait position Pwb and the processing position Pp and between the processing position Pp and the post-unloading wait position Pwa.

In the above-described embodiment, the turn driving unit 47 of the conveying apparatus 31 turns the arms 46, 46 using the worm gear mechanism. However, the invention is not limited to this aspect. The turn driving unit 47 may control an air cylinder to turn the arms 46, 46. Specifically, tongue portions are provided on annular portions of the arms 46, 46. Then, a rod of the air cylinder may be controlled and extended, and the extended rod may be brought into abutting contact with the tongue portions of the arms 46, 46 to turn the arms 46, 46 around the turning shaft through the turning angle α°. To reset the turned arms 46, 46 to the original state, the extended rod may be contracted and the arms 46, 46 may be reversely rotated using a predetermined mechanism. This also produces adequate effects.

In the above-described embodiment, the sandwich driving unit 45 of the conveying apparatus 31 controls the second motor 45*b* using the second ball screw mechanism BS2 to allow the two arms 46, 46 to simultaneously rotate in the opposite directions. However, the invention is not limited to this aspect. The arms 46, 46 may have respective independent driving mechanisms driven by different control units.

In the above-described embodiment, each of the machine tools 11 to 13 (processing apparatuses) includes the fixed first side wall 14 and the fixed second side wall 15 that define the space between the processing position Pp and the pre-loading wait position Pwb and the space between the processing position Pp and the post-unloading wait position Pwa (wait position), respectively. When moving the workpiece W from the pre-loading wait position Pwb (wait position) or processing position Pp (processing position) that is one position to the processing position Pp (processing position) or the post-unloading wait position Pwa (wait position) that is the other position, the control apparatus 70 turns the two arms 46, 46 with the workpiece W sandwiched therebetween to lift the workpiece W and moves the lifted workpiece W to pass through the space in front of the first side wall 14 and the second side wall 15 to the other position along with the two arms 46, 46.

However, the invention is not limited to this aspect. The fixed first side wall 14 and the fixed second side wall 15 may be omitted from each of the machine tools 11 to 13 (processing apparatuses). Instead of the first side wall 14 and the second side wall 15, an opening door may be provided which is opened and closed when the workpiece W is moved. Alternatively, all side walls may be omitted from each of the machine tools 11 to 13. In these cases, when the workpiece W is moved from one position to the other position, circumventing the first side wall 14 and the second side wall 15 is not needed. The arms 46, 46 may be slightly turned around the turning shaft to slightly lift the workpiece W. This configuration also eliminates the need for elevating apparatuses and is thus sufficiently effective for omitting elevating apparatuses compared to the related art.

In the above-described embodiment, the conveying apparatus 31 conveys the workpiece W between the pre-loading wait position Pwb (wait position) and processing position Pp (processing position) of each of the machine tools 11 to 13 and between the processing position Pp (processing position) and the post-unloading wait position Pwa (wait position) of the machine tool. However, the invention is not limited to this aspect. It is also preferable that the conveying apparatus 31 performs only one of the conveyance between the processing position Pp and the pre-loading wait position Pwb and the conveyance between the processing position Pp and the post-unloading wait position Pwa.

In the above-described embodiment, the conveying apparatus 31 is used for the machine tools 11 to 13 (processing apparatuses) that performs cutting (predetermined processing) on the workpiece W (article) mounted at the processing position Pp. However, the invention is not limited to this aspect. The processing apparatuses may be plating machines or grinders. Any other processing apparatuses may be used.

In the above-described embodiment, the conveying apparatus 31 conveys the workpiece W between the pre-loading wait position Pwb (wait position) and processing position Pp (processing position) of each of the machine tools 11 to 13 and between the processing position Pp (processing position) and the post-unloading wait position Pwa (wait position) of the machine tool. However, the invention is not limited to this aspect. The conveying apparatus may convey the workpiece W between the processing positions Pp in the machine tools 11 to 13. For example, when machining processing at the processing position Pp in the first machine tool 11 is completed, the conveying apparatus may convey the workpiece W from the processing position Pp in the first machine tool 11 to the processing position Pp in the second machine tool 12. Furthermore, for example, when machining processing at the processing position Pp in the second machine tool 12 is completed, the conveying apparatus may convey the workpiece W from the processing position Pp in the second machine tool 12 to the processing position Pp in the third machine tool 13.

In this case, the processing position in one of the machine tools in which machining processing is in execution corresponds to the processing position Pp in the invention. The processing position Pp in the machine tool adjacent to and upstream of the processing position Pp in the machine tool in which machining processing is in execution corresponds to the pre-loading wait position Pwb (wait position) in the invention. The processing position Pp in the machine tool adjacent to and downstream of the processing position Pp in the machine tool in which machining processing is in execution corresponds to the post-unloading wait position Pwa (wait position) in the invention. This configuration is also effective.

In the above-described embodiment, the two arms 46 of the conveying apparatus 31 are each provided on the corresponding one of the opposite sides of the workpiece W and sandwich the workpiece W therebetween under the predetermined sandwiching load P. However, the invention is not limited to this aspect. Any number of arms 46 may be provided so long as the workpiece W can be sandwiched between the arms 46 under the predetermined sandwiching load P. For example, two arms 46 may be provided on each of the opposite sides of the workpiece W. Alternatively, for example, two arms 46 may be provided at one side surface of the workpiece W, whereas exclusively one arm 46 may be provided at the other side surface of the workpiece W. This combination is only an example, and any other combination of the arms 46 may be provided.

What is claimed is:

1. A conveying apparatus for a processing apparatus that executes predetermined processing on an article mounted at a processing position, and that conveys the article between a wait position and the processing position which is separated from the wait position in both vertical and horizontal directions, the conveying apparatus comprising:
   a guide extending between the wait position and the processing position;
   a body that engages with the guide so as to be movable in an extending direction of the guide;
   a plurality of arms that are pivotable about a horizontal axis adjacent base ends of the arms, the horizontal axis being fixed to the body and extending parallel to the extending direction of the guide, such that leading ends of the arms are able to move between the wait position and the processing position, wherein the arms are also movable linearly toward and away from one another in a path along the direction of the horizontal axis, to maintain a constant spacing of the leading ends of the arms from the horizontal axis for all positions of the arms along said path as viewed in a vertical direction perpendicular to said horizontal axis, and to be able to sandwich the article between the leading ends of the arms; and
   a controller that performs control to turn the arms about the axis to lift an article located at one of the wait position and the processing position and sandwiched between the arms, and to move the arms with the article kept lifted by the arms to the other of the wait position and the processing position, the controller also performing control to turn the arms to lower and mount the article at the other of the wait position and the processing position.

2. The conveying apparatus according to claim 1, further comprising the processing apparatus, wherein
   the processing apparatus includes side walls that define a space between the processing position and the wait position and that are not allowed to be opened or closed,
   when moving the article from the one of the wait position and the processing position to the other, the controller turns the arms about the axis to lift the article and moves the article kept lifted by the aims to the other of the wait position and the processing position by allowing the article and the arms to pass through a space defined to lie in front of the side walls and located closer to the base ends of the arms than the side walls.

3. The conveying apparatus according to claim 2, wherein
   the wait position that is set on each of opposite sides of the processing position is a pre-loading wait position at which the article not subjected to the predetermined processing yet waits, and a post-unloading wait position at which the article having subjected to the predetermined processing at the processing position waits,
   the side walls are a first side wall and a second side wall that define a space between the processing position and the pre-loading wait position and a space between the processing position and the post-unloading wait position, respectively,
   the conveying apparatus includes an opening door that is allowed to be opened and closed with respect to an opening between the first side wall and the second side wall that serves as a doorway through which the article is transferred to or from the processing position when the arms are turned to lower the article so as to load and transfer the article to the processing position or when the article is lifted to be unloaded and transferred from the processing position,
   the controller includes a loading control unit that performs control to turn the arms about the axis to lift the article located at the pre-loading wait position and sandwiched between the arms, move the lifted article and the arms to pass through the space in front of the first side wall to the processing position, and then turn the arms about the axis to pass through the opening to lower and mount the article at the processing position; and
   an unloading control unit that performs control to turn the arms about the axis to lift the article located at, the processing position and sandwiched between the two anus to pass through the opening, move the lifted article and the arms to pass through the space in front of the second side wall to the post-unloading wait position, and then turn the two arms about the axis to lower and mount the article at the post-unloading wait position.

4. The conveying apparatus according to claim 1, further comprising:
   a movement driving unit controlled by the controller to move the body in the extending direction with respect to the guide;
   a sandwich driving unit controlled by the controller to change the separation distance between the arms to sandwich the article between the leading ends of the arms located at opposite sides of the article, under a predetermined load at which the article is enabled to be lifted: and
   a turn driving unit controlled by the controller to turn the arms about the axis with the article sandwiched between the arms under the predetermined load by the sandwich driving unit around a predetermined turning shaft provided at the base ends of the arms so as to move the leading ends of the arms in the up-down direction and to maintain a state of the arms resulting from turning the arms about the axis through the predetermined turning angle.

5. The conveying apparatus according to claim 1, wherein the processing apparatus is a machine tool, and
   the article is a workpiece.

6. The conveying apparatus according to claim 5, further comprising:
   a receiving member that receives coolant falling down from the article lifted while being tilted according to a turning angle of the arms about the axis when the arms with the article sandwiched between the arms are turned about the axis to lift up the article under control of the controller.

* * * * *